United States Patent
Tervonen et al.

(10) Patent No.: US 6,366,378 B1
(45) Date of Patent: Apr. 2, 2002

(54) OPTICAL MULTIPLEXING AND DEMULTIPLEXING

(75) Inventors: Ari Tervonen, Helsinki; Jaakko Aarnio, Espoo, both of (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/416,905

(22) Filed: Oct. 13, 1999

Related U.S. Application Data

(63) Continuation of application No. PCT/FI98/00436, filed on May 26, 1998.

(30) Foreign Application Priority Data

May 26, 1997 (FI) .................................................. 972226

(51) Int. Cl.[7] ........................ H04B 10/00; H04B 10/12; H04J 14/00; H04J 14/02
(52) U.S. Cl. ........................ 359/130; 385/24; 385/32; 385/37; 359/124
(58) Field of Search ................................ 359/124, 130; 385/32, 37, 24

(56) References Cited

U.S. PATENT DOCUMENTS

| | | | |
|---|---|---|---|
| 5,243,672 A | 9/1993 | Dragone | 385/46 |
| 5,488,680 A | 1/1996 | Dragone | |
| 5,504,606 A | 4/1996 | Frigo | 359/118 |
| 5,546,483 A | 8/1996 | Inoue | 385/14 |
| 5,559,624 A | 9/1996 | Darcie | 359/125 |
| 5,680,234 A | 10/1997 | Darcie | 359/110 |
| 5,745,612 A | * 4/1998 | Wang | 385/24 |
| 5,936,752 A | * 8/1999 | Bishop | 359/124 |
| 5,940,555 A | * 8/1999 | Inaba | 385/24 |
| 6,049,640 A | 4/2000 | Doerr | 385/15 |
| 6,097,517 A | 8/2000 | Okayama | 359/124 |

FOREIGN PATENT DOCUMENTS

| | | |
|---|---|---|
| EP | 0 591 042 | 4/1994 |
| WO | WO 98/04944 | 2/1998 |

OTHER PUBLICATIONS

Nov. 24, 1994, H. Takahashi et al. "Anticrosstalk arrayed–waveguide add–drop multiplexer with foldback paths for penalty free transmission" *Electronics Letters*, vol. 30, No. 24, pp. 2053–2055.

Mar. 1995, H. Takahashi et al. "Transmission Characteristics of Arrayed Waveguide N×N Wavelength Multiplexer" *Journal of Lightwave Technology*, vol. 13, No. 13, pp. 447–455.

Dragone, C. An N×N Optical Multiplexer Using a Planar Arrangement of Two Star Couplers, IEEE Photonics Technology Letters, vol. 3, No. 9, Sep. 1991.

\* cited by examiner

*Primary Examiner*—Jason Chan
*Assistant Examiner*—Agustin Bello
(74) *Attorney, Agent, or Firm*—Altera Law Group

(57) ABSTRACT

The invention relates to the implementation of multiplexing and demultiplexing of optical signals. The multiplexing and demultiplexing are carried out by using the same waveguide phased array component (WGA). On the first side, the component comprises at least an input port and an output port (IG, OG), and on its second side a first group of ports that constitute the demultiplexer function output ports, and a second group of ports that constitute the multiplexer function input ports. An optical input signal is applied to the input port, such an input signal comprising a number of signals each at its own wavelength, the input signal is demultiplexed in the component and the demultiplexed signals are coupled to ports of the first group. The signals to be multiplexed are applied to ports of the second group and the multiplexed signal is coupled to the output port (OG). To reduce crosstalk, the signals at different wavelengths and the signals to be multiplexed are demultiplexed and applied, respectively, to alternate second side (B) ports so that the second side ports alternately have a port belonging to the first group and a port belonging to the second group.

3 Claims, 3 Drawing Sheets

US 6,366,378 B1

OPTICAL MULTIPLEXING AND DEMULTIPLEXING

"This application is a continuation of international application No. PCT/FI98/00436, filed May 26, 1998, pending."

FIELD OF THE INVENTION

The invention generally relates to optical transmission systems employing wavelength division multiplexing, and particularly to a so-called waveguide phased array component used therein to carry out multiplexing and demultiplexing of the optical signal.

BACKGROUND OF THE INVENTION

Wavelength Division Multiplexing (WDM) represents an efficient way to increase manyfold the capacity of an optical fiber. In wavelength division multiplexing, a number of independent transmitter-receiver pairs use the same fiber. The principle of WDM is illustrated in FIGS. 1a and 1b by using a system comprising four parallel transmitter-receiver pairs as an example. Each of the four information sources (not shown in the figure) modulates one of the four optical transmitters each of which produces light at a different wavelength ($\lambda_1 \ldots \lambda_4$). As appears from FIG. 1a, the modulation bandwidth of each source is narrower than the separation between the wavelengths, resulting in that the spectra of the modulated signals do not overlap. The signals produced by the transmitters are combined into the same optical fiber OF in a WDM multiplexer WDM1, which is an entirely optical (and often passive) component. At the opposite end of the fiber, a WDM demultiplexer WDM2, also an entirely optical (and often passive) component, separates the different spectral components of the combined signal from each other. Each of these signals is detected by a different receiver. Thus, each signal is assigned a narrow wavelength window in a specific wavelength range. A typical practical example could then be a system where the signals are in the 1550 nm wavelength range, e.g. so that the first signal is at the wavelength 1544 nm, the second signal at the wavelength 1548 nm, the third signal at the wavelength 1552 nm, and the fourth signal at the wavelength 1556 nm. Nowadays, to an ever greater extent, the de facto standard for wavelength separation is a multiple of 100 GHz (appr. 0.8 nm).

The waveguide phased array component (also known as waveguide array grating or arrayed waveguide grating) is a known component in fiber optics, most suitable for systems employing wavelength division multiplexing due to e.g. the fact that a large number of wavelengths can be transferred over it, such as a WDM signal comprising 16 or 32 wavelengths.

FIG. 2 illustrates the structure of a waveguide phased array component WGA. The component comprises, integrated on the same substrate, N optical input/output guides AWG on the first side of the component, N optical input/output guides BWG on the second side of the component, two slab waveguides SWG1 and SWG2, and a grating GR constituted by optical channel waveguides WG, the grating GR connecting the slab waveguides to one another. Both sides of the component may act as the input or output side, whereby the waveguides AWG and BWG may be output or input guides. The slab waveguides, which connect input/output guides to separate channel waveguides WG in the grating, restrict propagation of light only in the plane perpendicular to the substrate but allow light propagation to the sides. The channel waveguides in the grating, instead, prevent light propagation also to the sides. The channel waveguides that connect to the slab waveguides on both sides are arranged on a circular arc so that each of them is directed towards the center waveguide of the waveguide group on the opposite side. A constant difference in length exists between two adjacent channel waveguides in the grating, the difference in length being a multiple of the center wavelength used. If light is input from the center input/output waveguide of one side at the center wavelength of the component, the light is distributed to all the waveguides of the grating. As the difference in length of the waveguides is a multiple of the center wavelength, all the waves are in the same phase upon arriving in the output slab waveguide whereupon the light is focused to the center output waveguide. In case the wavelength differs from the center wavelength, the wave front arriving in the output is slightly tilted, which means that it is not focused exactly at the center but at another waveguide of the output side. Hence, the component focuses different wavelengths to different outputs, the dimensioning of the component determining which wavelengths are focused on which output. Similarly as the wavelength of the center input waveguide determines which the output waveguide is, the location of the input waveguide determines which the output waveguide is.

The waveguide phased array component thus comprises a number of light channels whose geometry defines that they have both focusing characteristics (a lens) and dispersing characteristics (the wavelength dependency of the grating).

FIG. 3 illustrates the basic operational principle of the component in association with a case in which three different wavelengths ($\lambda_1, \lambda_2, \lambda_3$) are used to couple light alternately to each of the three input ports. As the figure shows, the output port of a specific wavelength channel depends both on the wavelength of the channel in question and which the input port of the channel in question is. The component is capable of demultiplexing N wavelength channels received from one input port so that each of the channels goes to a different output port. How the channels are distributed among the output ports depends on which the input port is. Examined from the network point of view, a situation thus exists in which a network element connected to a specific output port and receiving a signal at a specific wavelength knows, based on the output port and the wavelength, from which input port the signal originates.

In the following, the operation of the component is examined in closer detail. A symmetrical N×N phased array component has N optical ports on the A-side and N optical ports on the B-side. The component has been so designed that it multiplexes wavelengths whose separation is $\Delta\lambda$. When optical fibers are connected to the optical ports, light is coupled between each port on the A-side and each port on the B-side on a wavelength determined from the formula: $\lambda=\lambda_0+\Delta\lambda(i+j-2)$. In the formula, i stands for the port sequence number on the A-side and j for the port sequence number on the B-side, and $\lambda_0$ is the wavelength coupling between the ports i=1 and j=1. The wavelength coupled between two ports is the same regardless of whether light is input to the A-side port and output from the B-side port or in the opposite direction, and the operation of the component is also in other respects symmetric as regards changes of the A- and B-sides.

The above description is also valid for a component in which the number of optical ports differs on the A-side and B-side. In such a case, N is the number of ports on the side which has the majority, and the other side may simply be seen as lacking some ports, but the coupling between the ports is nevertheless described by the above formula.

The basic function of the component as a demultiplexer is illustrated as the wavelengths coupling from one A-side port to all the B-side ports so that a dedicated wavelength is coupled to each of them. This is illustrated in FIG. 4a. For example, when light is input to port i=1, the wavelengths $\lambda=\lambda_0+\Delta\lambda(j-1)$ couple to the output ports. A reverse operation as a multiplexer is obtained when a wavelength is input to each A-side port, the wavelengths being selected so that all wavelengths are coupled out of the same B-side port. This is illustrated by FIG. 4b. For example, when the wavelength input to each port is $\lambda=\lambda_0+\Delta\lambda(i-1)$ all wavelengths are coupled out of the port j=1.

Commonly the operation of the component is periodic also with respect to wavelength, the period between the wavelengths being the Free Spectral Range (FSR). In such a case, if a coupling exists between two ports at the wavelength $\lambda$, a coupling also exists between them at the wavelengths $\lambda+n \times FSR$, where n is a positive or negative integer. The components used in practice are planned so that FSR is larger than $\Delta\lambda \times N$ because otherwise the same wavelength couples from a specific input port to more than one output port, which is undesirable. A special case is an N×N phased array where FSR equals $\Delta\lambda \times N$ exactly. In such a component, the same N wavelengths $\lambda=\lambda_0, \lambda_0+\Delta\lambda_1, \lambda_0+2\Delta\lambda, \ldots, \lambda_0+(N-1)$ from each A-side port can each be coupled to a different port on the B-side. This also means that the order of these wavelengths is always different on the B-side ports whenever the coupling takes place from a different port on the A-side.

The theoretical basis of the waveguide phased array component is described more closely e.g. in *Transmission Characteristics of Arrayed Waveguide NxN Wavelength Multiplexer*, Journal of Lightwave Technology, pp. 447–455, Vol. 13, No. 3, March 1995, in which readers interested in the topic can find a more thorough description.

Nowadays, two methods are known to use the phased array component so that the same component simultaneously acts as a multiplexer and demultiplexer for the same set of wavelengths. These methods will be described briefly in the following. Both methods are also described in Anti-crosstalk arrayed-waveguide add-drop multiplexer with foldback paths for penalty-free transmission, Electronics Letters, pp. 2053–2055, November 1994, Vol. 30, No. 24.

In the first prior art method, the input fiber of the demultiplexer function is connected to the A-side port i=k, and the output fibers of which there are N-1 are connected to all the B-side ports but the one whose sequence number j is equal to k. Thus, N-1 wavelengths are separated to the output fibers. The input fibers of the multiplexer function, of which there are N-1, are connected to the free A-side ports, to all other ports but the one whose sequence number i is equal to k, whereby the same N-1 wavelengths for which demultiplexing was carried out are multiplexed to the fiber connected to the B-side port j=k.

The problem with such a solution is that the same wavelengths in the multiplexing and demultiplexing pass the component in the same direction, which leads to crosstalk between two signals that are at the same wavelength.

In the second prior art method, the input fiber of the demultiplexer function is connected to the A-side port i=k (k being no more than N/2 where N is even number of ports), and the output fibers, of which there are N/2, are connected to ports j=N/2+1, N/2+2, ..., N on the B-side. So, N/2 different wavelengths are separated to the output fibers. The input fibers of the multiplexer function, of which there are N/2, are connected to the free B-side ports j=1, 2 ..., N/2, whereby the same N/2 wavelengths for which demultiplexing was carried out are multiplexed to the fiber connected to the A-side port i=k+N/2.

This solution provides the advantage that the same wavelengths present in the multiplexing and demultiplexing pass the component in opposite directions, which considerably reduces crosstalk between two signals at the same wavelength. The problem of this solution is that crosstalk takes place between different wavelengths passing through the component in the same direction, particularly between adjacent wavelengths coupled to adjacent ports.

SUMMARY OF THE INVENTION

The object of the invention is to obviate the above drawbacks and to obtain a solution by means of which crosstalk can be minimized both between two signals at the same wavelength and between different wavelengths passing through the component.

This object is achieved with the solution defined in the independent claims.

The idea of the invention is to carry out the multiplexer and demultiplexer functions so that the signals being multiplexed and demultiplexed propagate through the component in opposite directions and, further, alternately couple to ports of one end.

Due to the inventive solution, crosstalk can be reduced (a) between same wavelengths because mutually identical wavelengths propagate in opposite directions, and additionally (b) between adjacent wavelengths because light propagates in opposite directions in adjacent ports.

The inventive solution provides the further advantage that multiplexing and demultiplexing can be carried out economically, because these functions can be carried out with the same component.

BRIEF DESCRIPTION OF THE DRAWINGS

The invention and its preferred embodiments will be described below in closer detail, with reference to FIGS. 5 ... 7b in the examples of the accompanying drawings, in which.

DETAILED DESCRIPTION OF THE INVENTION

Figure 5:
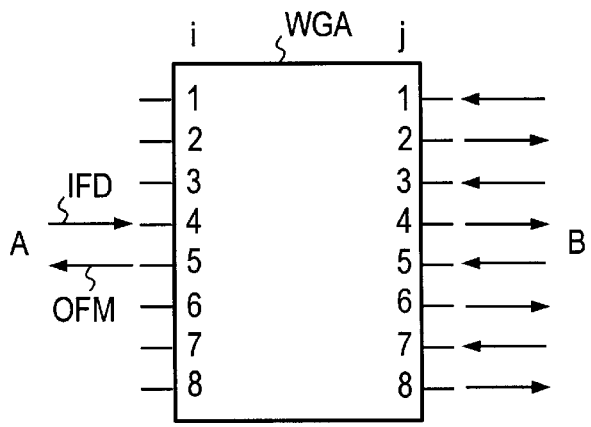
FIG. 5 illustrates the multiplexing and demultiplexing principle according to the invention.

According to the invention, the multiplexer and demultiplexer functions are carried out as illustrated by the example of FIG. 5. The input fiber IFD of the demultiplexer function is connected to an A-side port of the waveguide phased array component. The output fibers of the demultiplexer function, of which there are N/2, are connected to even ports on the B-side. In such a case, N/2 different wavelengths are separated to the output ports. The input fibers of the multiplexer function, of which there are N/2 also, are connected to the free, odd B-side ports whereby the same N/2 different wavelengths that were demultiplexed are multiplexed to the fiber OFM connected to the A-side port (adjacent port to the one to which the fiber IFD is connected).

Thus, the ports on the B-side are divided into two groups; the first group consisting of the demultiplexer function output ports (illustrated with outgoing arrows), and a second group consisting of the multiplexer function input ports (illustrated with incoming arrows). The ports may naturally be assigned to the groups in an opposite order, so that the demultiplexer output fibers are connected to the odd ports on the B-side and the multiplexer function input fibers to even ports. Light thus propagates into opposite directions in adjacent ports on the B-side.

An advantageous use for the component implemented according to the invention is an add/drop device or filter in an optical network. The function of an optical add/drop filter is (1) to guide a preselected narrowband channel (wavelength) out of the optical WDM signal that propagates in the fiber coming to the filter (drop function), and/or (2) to add a preselected narrowband channel to the fiber leaving the filter (add function). Signals (wavelengths) that have not been selected to be dropped pass the add/drop filter from the input fiber to the output fiber. With the filter, then, the desired narrowband channel is added or dropped without influencing the spectrum of the optical WDM signal in any other way. To be able to flexibly configure optical networks according to traffic needs, the add/drop filters are replaced by network elements in which the wavelengths to be dropped/added can be selected. Below, such a device will be referred to as an add/drop device. In other words, an add/drop device is a network element that can be configured so that the wavelengths to be dropped/added can be chosen.

Figure 6:
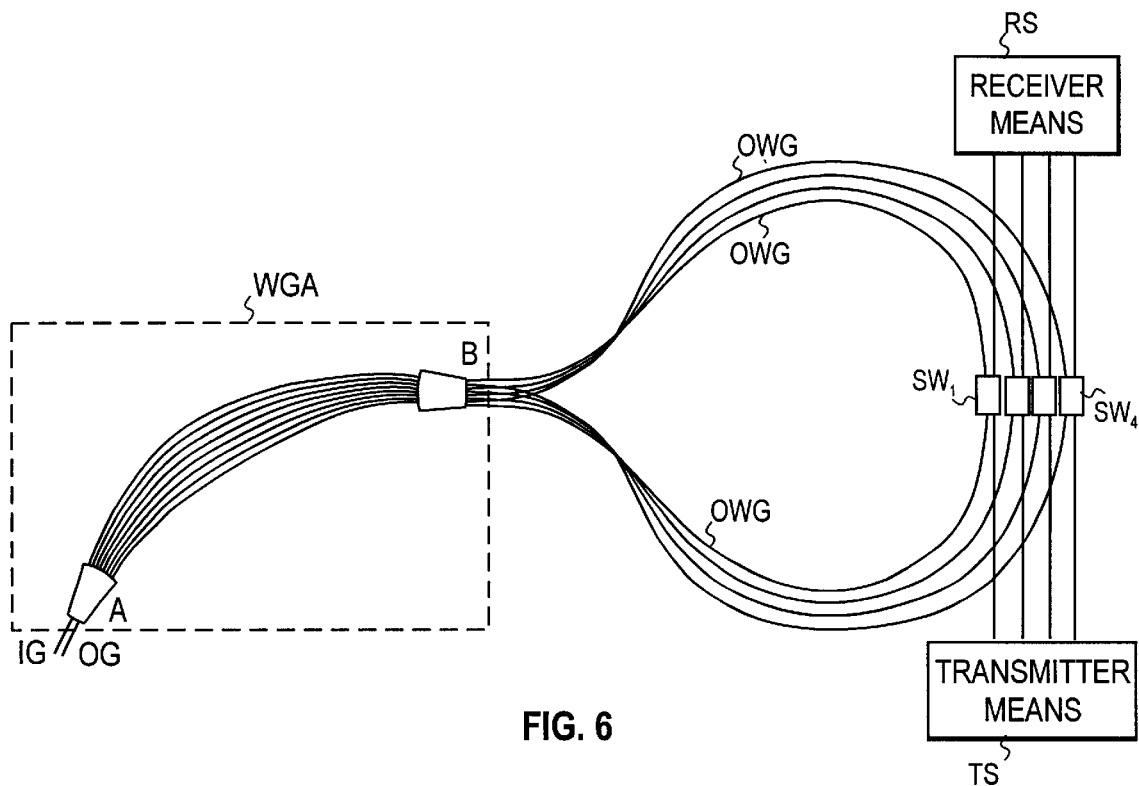
FIG. 6 illustrates one preferred implementation of the inventive component.

FIG. 6 illustrates an add/drop device that is based on the inventive solution in which the waveguides of the component are connected to the ports according to the principle of FIG. 5. The device has two ports on the A-side, one of these being the input port IG (to which the input fiber is connected) and the second being the output port (to which the output fiber is connected). There are N ports (N being an even integer) on the B-side. As described above, a signal having N/2 signals at different wavelengths is received at the input fiber that is connected to the port i=1 on the A-side, whereby light is coupled to the demultiplexer output ports at different wavelengths (one wavelength to each port). These output ports (aforementioned first group) are in this example the B-side odd ports, and the multiplexer input ports (aforementioned second group) are the B-side even ports.

Ports in the first and second group, corresponding to a specific wavelength, form a pair of ports, and for each of such pairs the device has an optical 2×2 switch (2 inputs and 2 outputs) $SW_i$ (i=1 ... N/2). An optical waveguide OWG is connected from a port belonging to the first group (demultiplexer output port) in the pair of ports to the first input of the optical switch corresponding to the pair in question. To the second input of the switch is connected a transmitter means TS that generates the wavelength channel to be added. The first output of the switch is connected to a port belonging to the second group (multiplexer input port) in the pair of ports in question, and the second output is connected to a receiving means RS, used to receive the dropped wavelength channel.

Figure 7A:
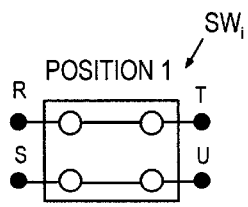
FIGS. 7a and 7b illustrate the positions of optical switches used in the device according to FIG. 6.
Figure 7B:
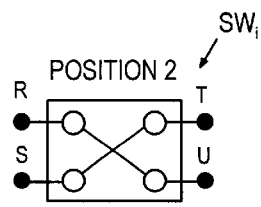

Each switch has a through connection position according to FIG. 7a, in which the switch connects the first input R to the first output T, and the second input S to the second output U, and a cross-connection position according to FIG. 7b, in which the switch connects the first input R to the second output U, and the second input S to the first output T. By placing the switches in desired positions, any wavelength channels may be chosen to be dropped/added.

The switches are known optical switches, for example electromechanical switches. Such switches are manufactured e.g. by JDS FITEL Inc., Canada. It should be noted that the switches do not necessarily need to be 2×2 switches, as the same functions can be constructed from larger switches. The size of the switches is consequently not an issue, as long as they operate as described above.

Figure 1A:
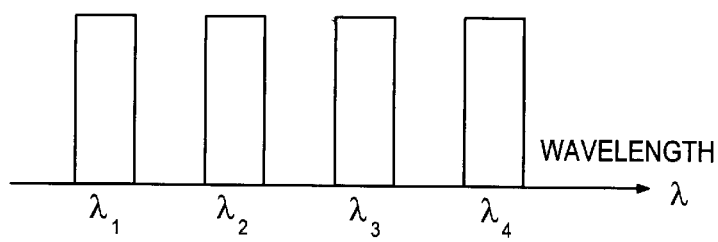
FIGS. 1a and 1b illustrate an optical transmission system employing wavelength division multiplexing.
Figure 1B:
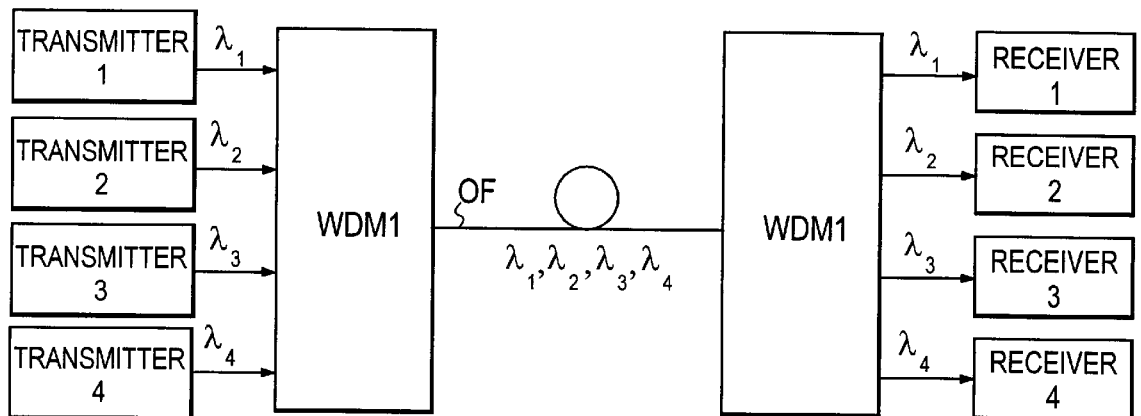
Figure 2:
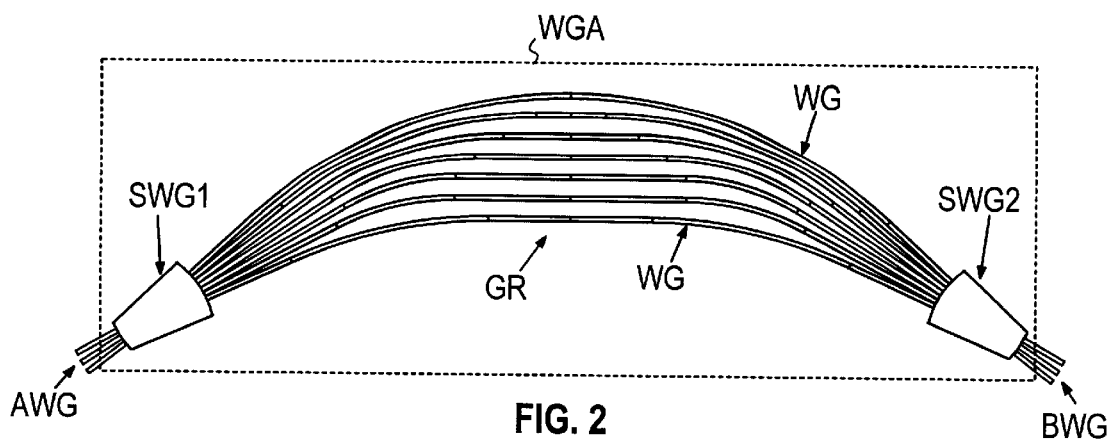
FIG. 2 illustrates the structure of the waveguide phased array component.
Figure 3:
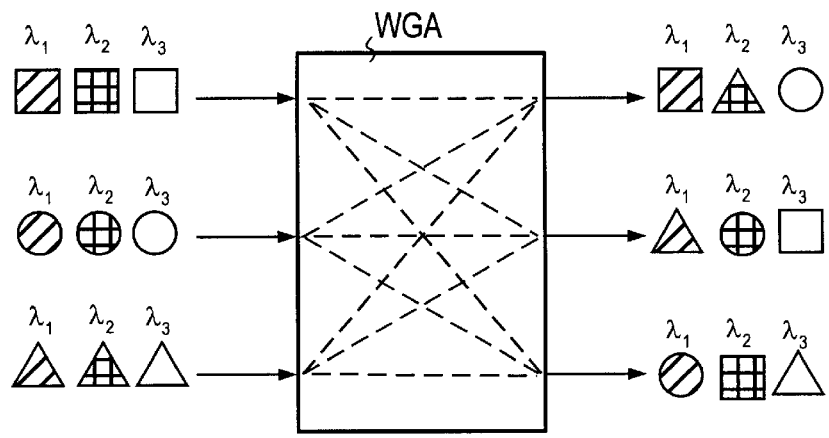
FIG. 3 illustrates the operation of the waveguide phased array component.
Figures 4A, 4B:
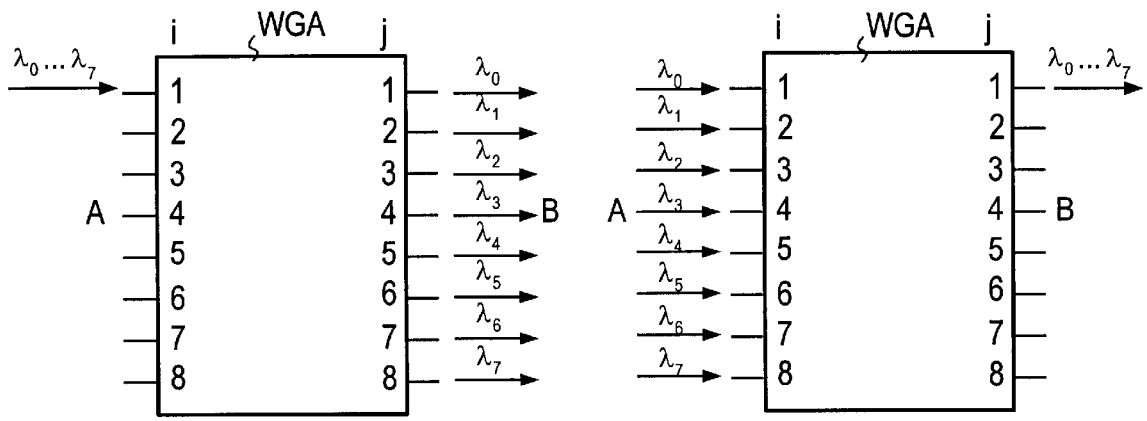
FIG. 4a illustrates the operation of the waveguide phased array component as a demultiplexer.
FIG. 4b illustrates the operation of the waveguide phased array component as a multiplexer.

It is not absolutely necessary to branch off the different wavelength channels for adding/dropping, but a specific wavelength channel can be branched off e.g. for measuring or adjusting procedures. Two links according to FIG. 1b may also exist in parallel, with operation in opposite directions. In such a case, both ends require multiplexer and demultiplexer functions, which may be incorporated in the same component in accordance with the invention.

The waveguide phased array component operating as described above is dimensioned as in prior art and manufactured by a prior art method, for example by planar fiber-optic technique using e.g. doped glass light channels that are manufactured on either silicon wafer or quartz glass wafer.

Although the invention is in the above described with reference to the examples in the accompanying drawings, it is obvious that the invention is not restricted thereto, but it may be varied within the scope of the inventive idea of the attached claims. The demultiplexer function output and the multiplexer function input do not necessarily have to be in adjacent ports, but an empty port may be left between them. It is essential, however, that the demultiplexer function outputs and the multiplexer function inputs on the second side (B-side) occur alternately, whereby two adjacent ports will not have signals propagating in the same direction. The component may also have empty ports on the A-side. The essential issue is that one of the ports acts as the input port and one as the output port. In other words, the inventive component may be implemented as part of a larger component.

What is claimed is:

1. A waveguide phased array component for carrying out multiplexing and demultiplexing of optical signals, the component including;

at least an input port and an output port (IG, OG) on a first side (A) of the component;

on a second side (B) of the component, a first group of ports, which constitute the demultiplexer function output ports, and a second group of ports, which constitute the multiplexer function input ports;

a demultiplexing device (SWG1, GR, SWG2) for demultiplexing a multiplexed signal applied to the input port, to the ports of the first group;

a multiplexing device (SWG2, GR, SWG1) for multiplexing signals applied to the ports of the second group, to the output port;

wherein the ports belonging to the first group and the ports belonging to the second group are alternately positioned on the second side (B) of the component;

wherein each port belonging to the first group is coupled via an optical waveguide (OWG) and an optical switching element (SWi) to each port corresponding to the same wavelength and belonging to the second group, wherein a first input (R) of the optical switching element (SWi), which belongs to the first group, is coupled to a first output (T), which belongs to the second group, of the same switching element;

the component further comprises a transmitter means (TS) coupled to a second input (S) of the optical switching element, and a receiving means (RS) to a second output, and wherein each switching element comprises at least two positions, so that in the first position it couples the first input (R) to the first output (T), and in the second position, the first input (R) to a second output (U) and the second input (S) to the first output (T).

2. The component as claimed in claim 1, wherein there are only two ports on the first side and any even number of ports larger than two on the second side.

3. The component as claimed in claim 2, wherein there are 2N ports on the second side, where N is the number of wavelengths applied to the input port.

* * * * *